US009659399B2

(12) United States Patent
Hakura et al.

(10) Patent No.: US 9,659,399 B2
(45) Date of Patent: May 23, 2017

(54) SYSTEM, METHOD, AND COMPUTER PROGRAM PRODUCT FOR PASSING ATTRIBUTE STRUCTURES BETWEEN SHADER STAGES IN A GRAPHICS PIPELINE

(71) Applicant: NVIDIA Corporation, Santa Clara, CA (US)

(72) Inventors: Ziyad Sami Hakura, Gilroy, CA (US); Henry Packard Moreton, Woodside, CA (US); Emmett M. Kilgariff, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 573 days.

(21) Appl. No.: 13/975,071

(22) Filed: Aug. 23, 2013

(65) Prior Publication Data

US 2015/0054827 A1 Feb. 26, 2015

(51) Int. Cl.
*G06T 15/80* (2011.01)
*G06T 1/20* (2006.01)
*G06T 15/04* (2011.01)
*G06T 15/00* (2011.01)

(52) U.S. Cl.
CPC ............ *G06T 15/005* (2013.01); *G06T 1/20* (2013.01); *G06T 15/04* (2013.01); *G06T 15/80* (2013.01)

(58) Field of Classification Search
CPC ......... G06T 15/005; G06T 15/80; G06T 1/20; G06T 15/04
See application file for complete search history.

(56) References Cited

U.S. PATENT DOCUMENTS

| 6,987,517 | B1* | 1/2006 | Donovan | G06T 15/04 345/552 |
| 2007/0097121 | A1* | 5/2007 | Loop | G06T 15/00 345/428 |
| 2011/0087864 | A1* | 4/2011 | Duluk, Jr. | G06F 9/30087 712/220 |
| 2013/0169634 | A1* | 7/2013 | Goel | G06T 15/005 345/423 |
| 2013/0194286 | A1* | 8/2013 | Bourd | G06F 9/544 345/545 |
| 2014/0098117 | A1* | 4/2014 | Goel | G06T 1/20 345/522 |
| 2014/0111513 | A1* | 4/2014 | Ceylan | G06T 17/20 345/423 |
| 2015/0317818 | A1* | 11/2015 | Howson | G06T 15/005 345/424 |

* cited by examiner

*Primary Examiner* — Jeffrey Chow
(74) *Attorney, Agent, or Firm* — Zilka-Kotab, PC (57) ABSTRACT

A system, method, and computer program product are provided for passing attribute structures between shader stages of a processing pipeline. The method includes the steps of receiving data represented at a first level by a processing pipeline including an upstream shader unit, a downstream shader unit, and a processing unit. The upstream shader unit processes the data to generate a first set of attributes corresponding to the data represented at a second level. The upstream shader unit also stores the first set of the attributes in a first portion of a memory system that can be read by the downstream shader unit and any shader units that are downstream in the processing pipeline relative to the upstream shader unit. In one embodiment, the processing unit is coupled between the upstream shader unit and the downstream shader unit.

19 Claims, 10 Drawing Sheets

SYSTEM, METHOD, AND COMPUTER PROGRAM PRODUCT FOR PASSING ATTRIBUTE STRUCTURES BETWEEN SHADER STAGES IN A GRAPHICS PIPELINE

FIELD OF THE INVENTION

The present invention relates to graphics processing, and more particularly to attribute structures.

BACKGROUND

Conventional graphics processing pipelines include a vertex shader, hull shader, tessellation unit, domain shader, a geometry shader, and a pixel shader that each process graphics geometry and generate attributes. The attributes generated by the vertex shader, processed by a hull shader and passed to the tessellation unit that produces a primitive topology and then to the domain shader. Dedicated first-in first-out (FIFO) buffer circuits may be coupled between the vertex shader and tessellation unit, between the tessellation unit and the domain shader, between the domain shader and the geometry shader, and between the geometry shader and the pixel shader to accommodate different processing throughputs. However, the number of entries in the FIFO buffer circuits is limited.

The domain shader computes per-vertex attributes that are output to the pixel shader, e.g., position, lighting, texture coordinates, and color. Modern graphics processing pipelines may be configured to generate as many as 128 different attributes, so the amount of data that is passed between the different shaders for each vertex has increased compared with conventional graphics processing pipelines. The per-vertex attributes are output by the domain shader to the geometry shader, which may subdivide primitives that are defined by the vertices, thereby generating additional vertices and associated attributes that are output to a rasterizer. The rasterizer determines pixel coverage and outputs the per-vertex attributes to the pixel shader that are needed to determine a color for each pixel.

As graphics processing capabilities have improved, the size of the primitives has decreased, so that, in some cases, each primitive may only cover a single pixel. The amount of attribute data that is generated and passed through the graphics processing pipeline to produce each pixel of an image has increased significantly compared with traditional graphics processing. Consequently, the capacity of the FIFO buffer circuits may be exceeded, resulting in a reduction in processing throughput and decreased performance. Thus, there is a need for addressing this issue and/or other issues associated with the prior art.

SUMMARY

A system, method, and computer program product are provided for passing attribute structures between shader stages of a processing pipeline. The method includes the steps of receiving represented at a first level by a processing pipeline including an upstream shader unit, a downstream shader unit, and a processing unit. The upstream shader unit processes the data to generate a first set of attributes corresponding to the data represented at a second level. The upstream shader unit also stores the first set of the attributes in a first portion of a memory system that can be read by the downstream shader unit and any additional shader units that are downstream in the processing pipeline relative to the upstream shader unit. In one embodiment, the processing unit is coupled between the upstream shader unit and the downstream shader unit.

DETAILED DESCRIPTION

The amount of attribute data that is generated may be reduced by delaying generation of some attributes until later in the graphics processing pipeline. The attributes that are generated by earlier stages in the graphics processing pipeline may be stored in attribute structures that can be accessed by one or more downstream processing units. Memory needed to store the attributes structures may be allocated by a shader program as the attributes to be stored in the structure are generated and may be deallocated by a last consuming processing stage of the graphics processing pipeline. Thereby, the amount of attribute data that is generated and passed through the graphics processing pipeline to produce each pixel of an image is decreased significantly compared with traditional graphics processing.

Figure 1:
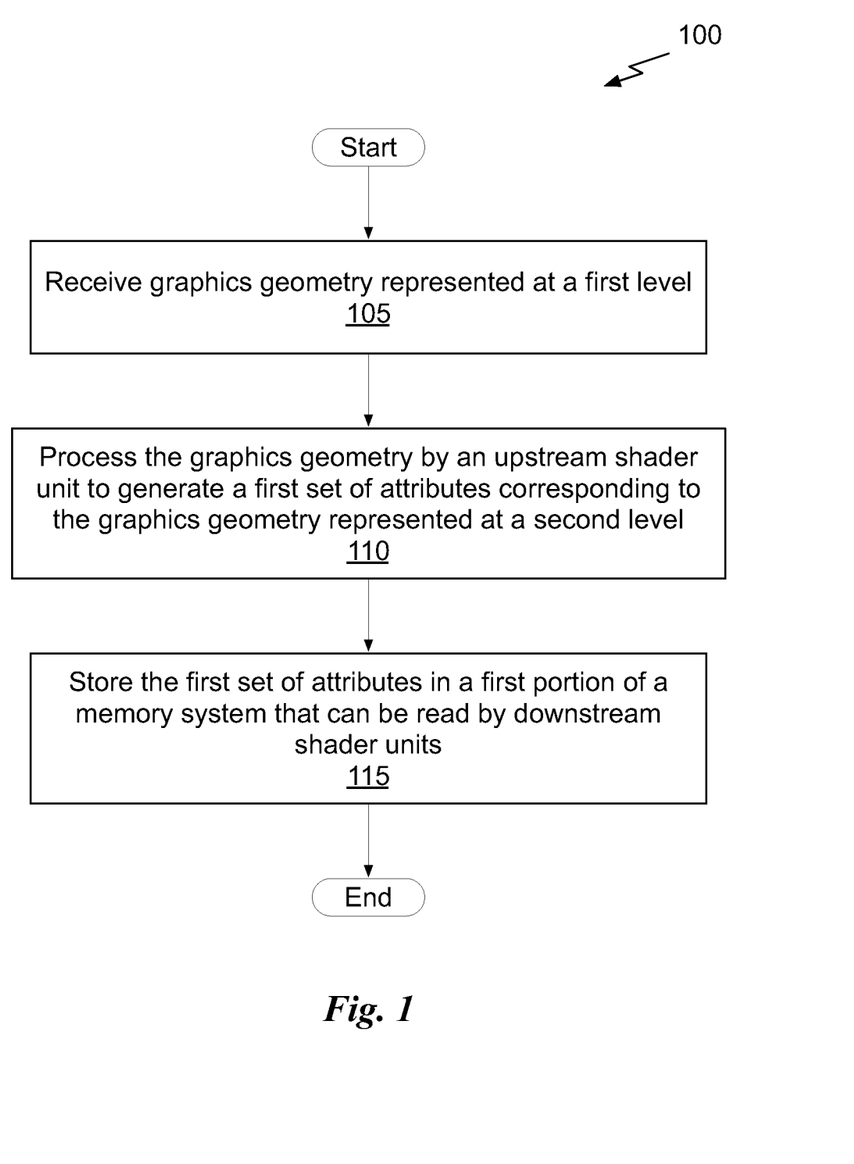
FIG. 1 illustrates a flowchart of a method for passing attribute structures between shader stages of a processing pipeline, in accordance with one embodiment.

FIG. 1 illustrates a flowchart of a method 100 for passing attribute structures between shader stages of a processing pipeline, in accordance with one embodiment. At step 105, data represented at a first level is received by a processing pipeline. In one embodiment, the data is graphics geometry data and the processing pipeline is a graphics processing pipeline includes an upstream shader unit, a downstream shader unit, and a processing unit that is coupled between the upstream shader unit and the downstream shader unit. In one embodiment, the upstream shader unit may be a vertex shader unit, a hull shader unit, a domain shader unit, or a geometry shader unit and the downstream shader unit may be a hull shader unit, a domain shader unit, a geometry shader unit, or a pixel shader unit. In one embodiment, the processing unit may be configured to perform tessellation, rasterization, or another graphics operation.

At step 110, the upstream shader unit processes the data to generate a first set of attributes corresponding to the data represented at a second level. In the context of the present description, data that is graphics geometry represented at the first level may include vertices defining high-order graphics primitives in object space, control points or vertices defining surface patches, or vertices defining graphics primitives such as points, lines, and triangles. In the context of the present description, data that is graphics geometry represented at the second level or another level may include control points or vertices defining surface patches, vertices defining graphics primitives, or pixel fragments in screen space. In general, the first level representation of graphics geometry requires less data compared with a descendent or lower (second, third, etc.) level representation of the graphics geometry. In the context of the present description, a set of attributes may be implemented as an attribute structure that includes one or more attributes associated with graphics geometry or a graphics primitive. Examples of attributes include, but are not limited to position coordinates, normal vectors, texture map coordinates, lighting parameters, color, and the like.

At step 115, the upstream shader unit also stores the first set of the attributes in a first portion of a memory system that can be read by the downstream shader unit and additional shader units that are downstream in the processing pipeline relative to the upstream shader unit. In the context of the following description, a memory system may include one or more of a first-level (L1) cache, a second-level (L2) cache, and memory comprising one or more discrete memory devices (e.g., die or chips) that are external to the graphics processing pipeline, such as dynamic random access memory (DRAM), static random access memory (SRAM), and the like.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
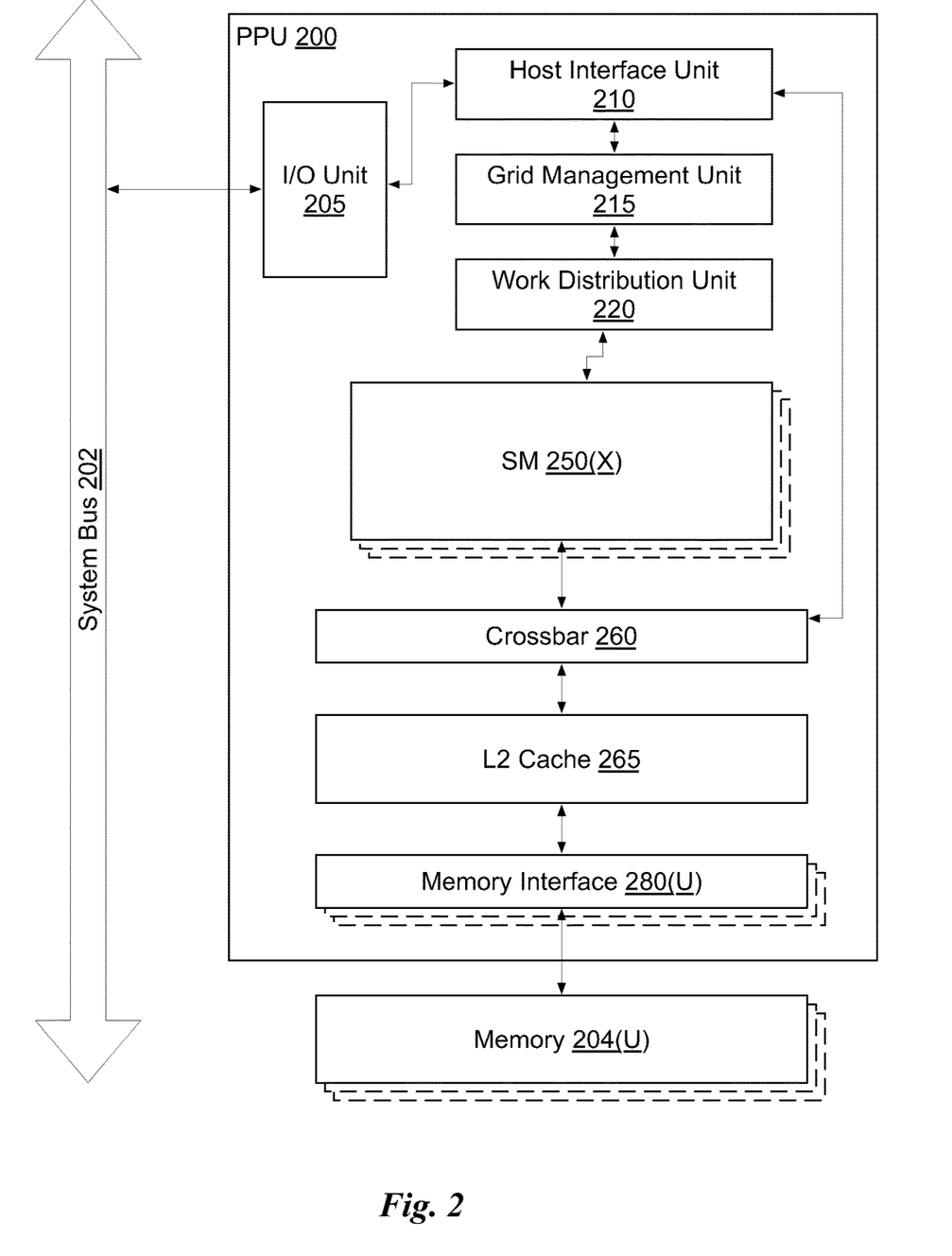
FIG. 2 illustrates a parallel processing unit (PPU), according to one embodiment.

FIG. 2 illustrates a parallel processing unit (PPU) 200, according to one embodiment. While a parallel processor is provided herein as an example of the PPU 200, it should be strongly noted that such processor is set forth for illustrative purposes only, and any processor may be employed to supplement and/or substitute for the same. In one embodiment, the PPU 200 is configured to execute a plurality of threads concurrently in two or more streaming multi-processors (SMs) 250. A thread (i.e., a thread of execution) is an instantiation of a set of instructions executing within a particular SM 250. Each SM 250, described below in more detail in conjunction with FIG. 3, may include, but is not limited to, one or more processing cores, one or more load/store units (LSUs), a level-one (L1) cache, shared memory, and the like.

In one embodiment, the PPU 200 includes an input/output (I/O) unit 205 configured to transmit and receive communications (i.e., commands, data, etc.) from a central processing unit (CPU) (not shown) over the system bus 202. The I/O unit 205 may implement a Peripheral Component Interconnect Express (PCIe) interface for communications over a PCIe bus. In alternative embodiments, the I/O unit 205 may implement other types of well-known bus interfaces.

The PPU 200 also includes a host interface unit 210 that decodes the commands and transmits the commands to the task management unit 215 or other units of the PPU 200 (e.g., memory interface 280) as the commands may specify. The host interface unit 210 is configured to route communications between and among the various logical units of the PPU 200.

In one embodiment, a program encoded as a command stream is written to a buffer by the CPU. The buffer is a region in memory, e.g., memory 204 or system memory, that is accessible (i.e., read/write) by both the CPU and the PPU 200. The CPU writes the command stream to the buffer and then transmits a pointer to the start of the command stream to the PPU 200. The host interface unit 210 provides the task management unit (TMU) 215 with pointers to one or more streams. The TMU 215 selects one or more streams and is configured to organize the selected streams as a pool of pending grids. The pool of pending grids may include new grids that have not yet been selected for execution and grids that have been partially executed and have been suspended.

A work distribution unit 220 that is coupled between the TMU 215 and the SMs 250 manages a pool of active grids, selecting and dispatching active grids for execution by the SMs 250. Pending grids are transferred to the active grid pool by the TMU 215 when a pending grid is eligible to execute, i.e., has no unresolved data dependencies. An active grid is transferred to the pending pool when execution of the active grid is blocked by a dependency. When execution of a grid is completed, the grid is removed from the active grid pool by the work distribution unit 220. In addition to receiving grids from the host interface unit 210 and the work distribution unit 220, the TMU 215 also receives grids that are dynamically generated by the SMs 250 during execution of a grid. These dynamically generated grids join the other pending grids in the pending grid pool.

In one embodiment, the CPU executes a driver kernel that implements an application programming interface (API) that enables one or more applications executing on the CPU to schedule operations for execution on the PPU 200. An application may include instructions (i.e., API calls) that cause the driver kernel to generate one or more grids for execution. In one embodiment, the PPU 200 implements a SIMD (Single-Instruction, Multiple-Data) architecture where each thread block (i.e., warp) in a grid is concurrently executed on a different data set by different threads in the thread block. The driver kernel defines thread blocks that are comprised of k related threads, such that threads in the same thread block may exchange data through shared memory. In one embodiment, a thread block comprises 32 related threads and a grid is an array of one or more thread blocks that execute the same stream and the different thread blocks may exchange data through global memory.

In one embodiment, the PPU 200 comprises X SMs 250(X). For example, the PPU 200 may include 15 distinct SMs 250. Each SM 250 is multi-threaded and configured to execute a plurality of threads (e.g., 32 threads) from a particular thread block concurrently. Each of the SMs 250 is connected to a level-two (L2) cache 265 via a crossbar 260 (or other type of interconnect network). The L2 cache 265 is connected to one or more memory interfaces 280. Memory interfaces 280 implement 16, 32, 64, 128-bit data buses, or the like, for high-speed data transfer. In one embodiment, the PPU 200 comprises U memory interfaces 280(U), where each memory interface 280(U) is connected to a corresponding memory device 204(U). For example, PPU 200 may be connected to up to 6 memory devices 204, such as graphics double-data-rate, version 5, synchronous dynamic random access memory (GDDR5 SDRAM).

In one embodiment, the PPU 200 implements a multi-level memory hierarchy. The memory 204 is located off-chip in SDRAM coupled to the PPU 200. Data from the memory 204 may be fetched and stored in the L2 cache 265, which is located on-chip and is shared between the various SMs 250. In one embodiment, each of the SMs 250 also implements an L1 cache. The L1 cache is private memory that is dedicated to a particular SM 250. Each of the L1 caches is coupled to the shared L2 cache 265. Data from the L2 cache 265 may be fetched and stored in each of the L1 caches for processing in the functional units of the SMs 250.

In one embodiment, the PPU 200 comprises a graphics processing unit (GPU). The PPU 200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. Attributes may include one of more of position, color, surface normal vector, texture coordinates, etc. The PPU 200 can be configured to process the graphics primitives to generate a frame buffer (i.e., pixel data for each of the pixels of the display). The driver kernel implements a graphics processing pipeline, such as the graphics processing pipeline defined by the OpenGL API.

An application writes model data for a scene (i.e., a collection of vertices and attributes) to memory. The model data defines each of the objects that may be visible on a display. The application then makes an API call to the driver kernel that requests the model data to be rendered and displayed. The driver kernel reads the model data and writes commands to the buffer to perform one or more operations to process the model data. The commands may encode different shader programs including one or more of a vertex shader, hull shader, geometry shader, pixel shader, etc. For example, the TMU 215 may configure one or more SMs 250 to execute a vertex shader program that processes a number of vertices defined by the model data. In one embodiment, the TMU 215 may configure different SMs 250 to execute different shader programs concurrently. For example, a first subset of SMs 250 may be configured to execute a vertex shader program while a second subset of SMs 250 may be configured to execute a pixel shader program. The first subset of SMs 250 processes vertex data to produce processed vertex data and writes the processed vertex data to the L2 cache 265 and/or the memory 204. After the processed vertex data is rasterized (i.e., transformed from three-dimensional data into two-dimensional data in screen space) to produce fragment data, the second subset of SMs 250 executes a pixel shader to produce processed fragment data, which is then blended with other processed fragment data and written to the frame buffer in memory 204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 200 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 200 is embodied on a single semiconductor substrate. In another embodiment, the PPU 200 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 200 may be included on a graphics card that includes one or more memory devices 204 such as GDDR5 SDRAM. The graphics card may be configured to interface with a PCIe slot on a motherboard of a desktop computer that includes, e.g., a northbridge chipset and a southbridge chipset. In yet another embodiment, the PPU 200 may be an integrated graphics processing unit (iGPU) included in the chipset (i.e., Northbridge) of the motherboard.

Figure 3:
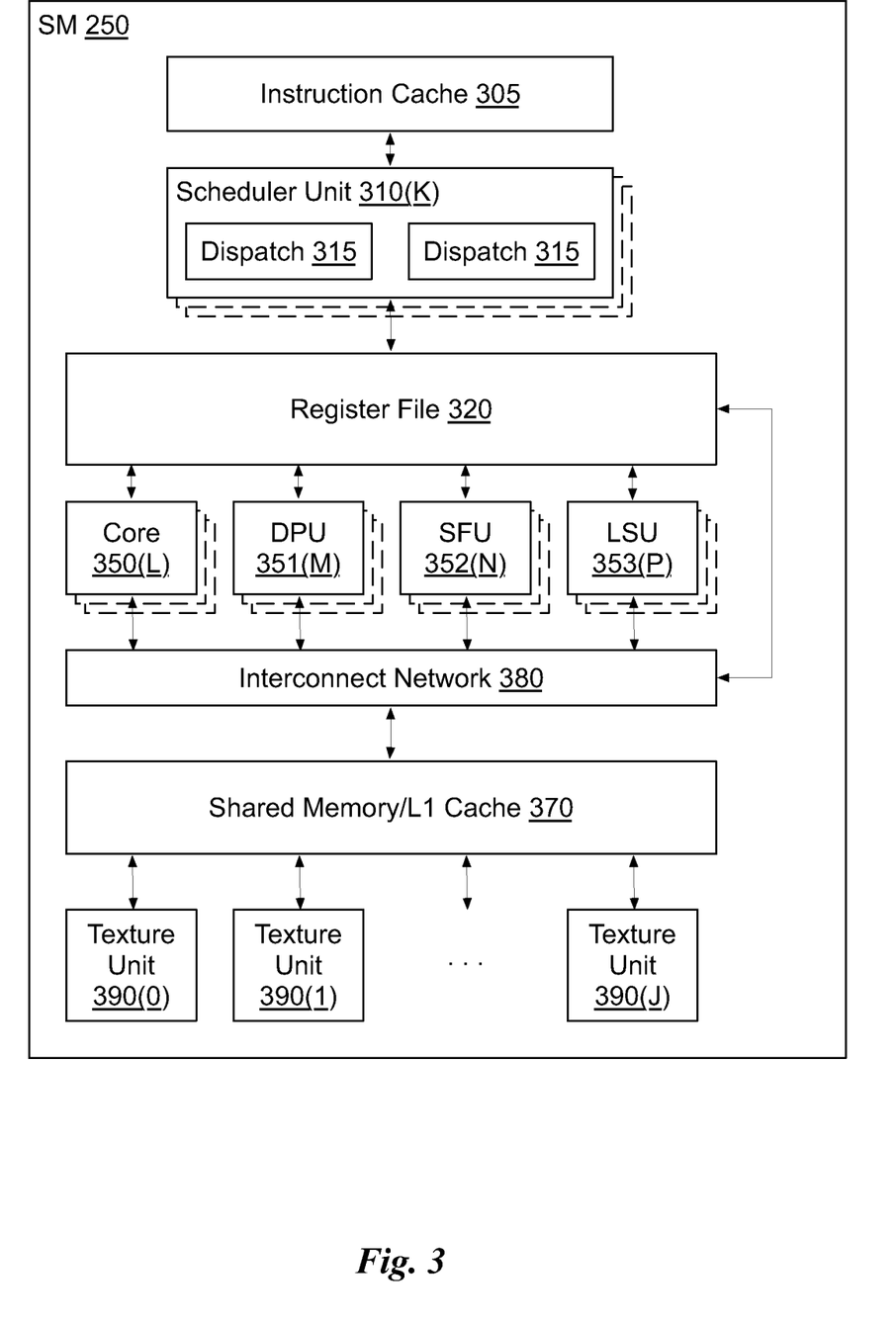
FIG. 3 illustrates the streaming multi-processor of FIG. 2, according to one embodiment.

FIG. 3 illustrates the streaming multi-processor 250 of FIG. 2, according to one embodiment. As shown in FIG. 3, the SM 250 includes an instruction cache 305, one or more scheduler units 310, a register file 320, one or more processing cores 350, one or more double precision units (DPUs) 351, one or more special function units (SFUs) 352, one or more load/store units (LSUs) 353, an interconnect network 380, a shared memory/L1 cache 370, and one or more texture units 390.

As described above, the work distribution unit 220 dispatches active grids for execution on one or more SMs 250 of the PPU 200. The scheduler unit 310 receives the grids from the work distribution unit 220 and manages instruction scheduling for one or more thread blocks of each active grid. The scheduler unit 310 schedules threads for execution in groups of parallel threads, where each group is called a warp. In one embodiment, each warp includes 32 threads. The scheduler unit 310 may manage a plurality of different thread blocks, allocating the thread blocks to warps for execution and then scheduling instructions from the plurality of different warps on the various functional units (i.e., cores 350, DPUs 351, SFUs 352, and LSUs 353) during each clock cycle.

In one embodiment, each scheduler unit 310 includes one or more instruction dispatch units 315. Each dispatch unit 315 is configured to transmit instructions to one or more of the functional units. In the embodiment shown in FIG. 3, the scheduler unit 310 includes two dispatch units 315 that enable two different instructions from the same warp to be dispatched during each clock cycle. In alternative embodiments, each scheduler unit 310 may include a single dispatch unit 315 or additional dispatch units 315.

Each SM 250 includes a register file 320 that provides a set of registers for the functional units of the SM 250. In one embodiment, the register file 320 is divided between each of the functional units such that each functional unit is allocated a dedicated portion of the register file 320. In another embodiment, the register file 320 is divided between the different warps being executed by the SM 250. The register file 320 provides temporary storage for operands connected to the data paths of the functional units.

Each SM 250 comprises L processing cores 350. In one embodiment, the SM 250 includes a large number (e.g., 192, etc.) of distinct processing cores 350. Each core 350 is a fully-pipelined, single-precision processing unit that includes a floating point arithmetic logic unit and an integer arithmetic logic unit. In one embodiment, the floating point arithmetic logic units implement the IEEE 754-2008 standard for floating point arithmetic. Each SM 250 also comprises M DPUs 351 that implement double-precision floating point arithmetic, N SFUs 352 that perform special functions (e.g., copy rectangle, pixel blending operations, and the like), and P LSUs 353 that implement load and store operations between the shared memory/L1 cache 370 and the register file 320. In one embodiment, the SM 250 includes 64 DPUs 351, 32 SFUs 352, and 32 LSUs 353.

Each SM 250 includes an interconnect network 380 that connects each of the functional units to the register file 320 and the shared memory/L1 cache 370. In one embodiment, the interconnect network 380 is a crossbar that can be configured to connect any of the functional units to any of the registers in the register file 320 or the memory locations in shared memory/L1 cache 370.

In one embodiment, the SM 250 is implemented within a GPU. In such an embodiment, the SM 250 comprises J texture units 390. The texture units 390 are configured to load texture maps (i.e., a 2D array of texels) from the memory 204 and sample the texture maps to produce sampled texture values for use in shader programs. The texture units 390 implement texture operations such as anti-aliasing operations using mip-maps (i.e., texture maps of varying levels of detail). In one embodiment, the SM 250 includes 16 texture units 390.

The PPU 200 described above may be configured to perform highly parallel computations much faster than conventional CPUs. Parallel computing has advantages in graphics processing, data compression, biometrics, stream processing algorithms, and the like.

Figure 4:
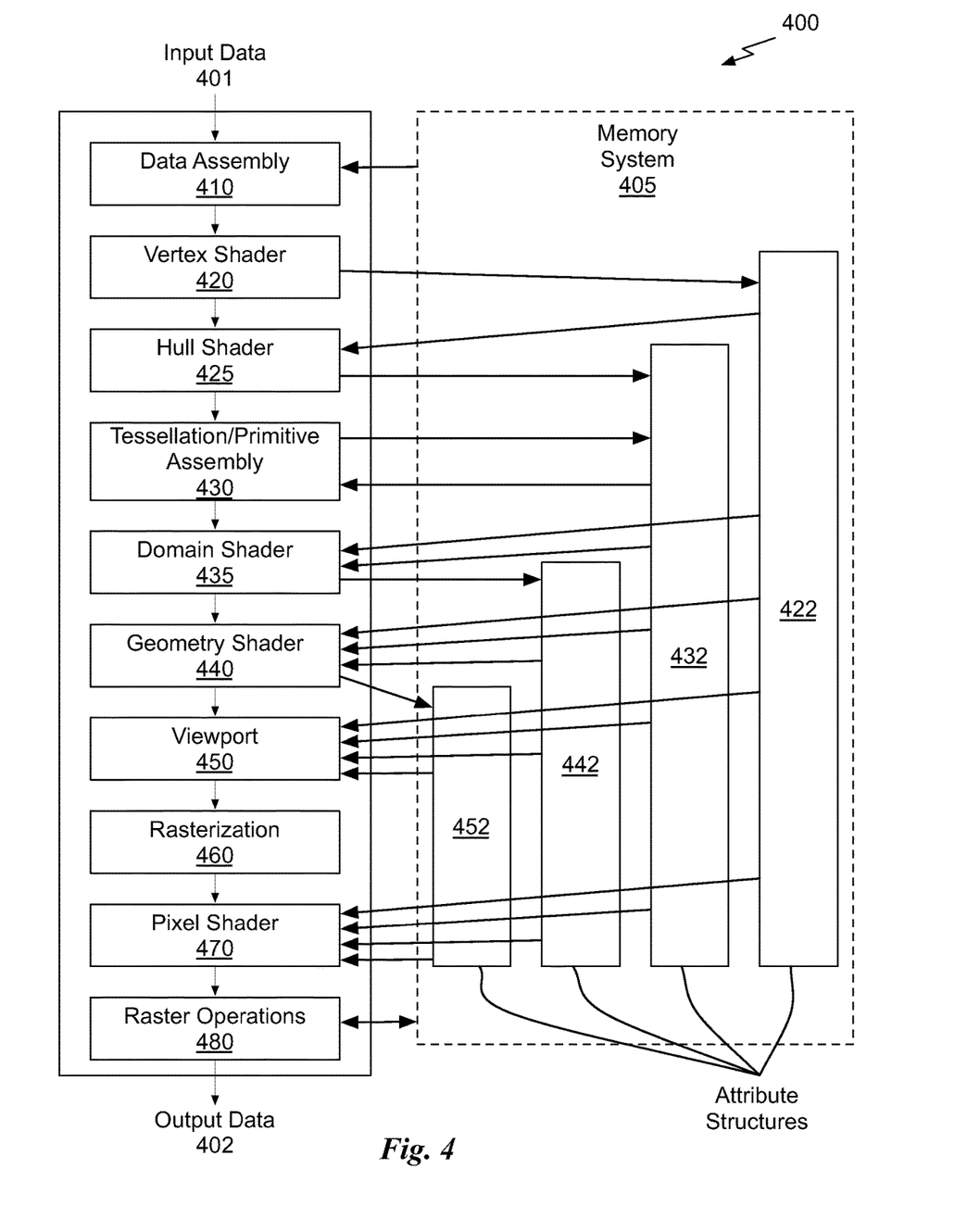
FIG. 4 is a conceptual diagram of a graphics processing pipeline implemented by the PPU of FIG. 2, in accordance with one embodiment.

FIG. 4 is a conceptual diagram of a graphics processing pipeline 400 implemented by the PPU 200 of FIG. 2, in accordance with one embodiment. The graphics processing pipeline 400 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 400 receives input data 401 that is transmitted from one stage to the next stage of the graphics processing pipeline 400 to generate output data 402. In one embodiment, the graphics processing pipeline 400 may represent a graphics processing pipeline defined by the OpenGL® API or by DirectX 11® by MICROSOFT.

As shown in FIG. 4, the graphics processing pipeline 400 comprises a pipeline architecture that includes a number of stages. The stages include, but are not limited to, a data assembly stage 410, a vertex shader stage 420, a hull shader stage 425, a tessellation/primitive assembly stage 430, a domain shader stage 435, a geometry shader stage 440, a viewport transform stage 450, a rasterization stage 460, a pixel shader stage 470, and a raster operations stage 480. In one embodiment, the input data 401 comprises commands that configure the processing units to implement the stages of the graphics processing pipeline 400 and high-order geometric primitives to be processed by the stages. The output data 402 may comprise pixel data (i.e., color data) that is copied into a frame buffer or other type of surface data structure in a memory (e.g., memory 204). The SMs 250 may be configured by shader program instructions to function as one or more of the shader stages (e.g., vertex, hull, domain, geometry, and pixel shaders).

The data assembly stage 410 receives the input data 401 that specifies vertex data for high-order graphics geometry. The data assembly stage 410 collects the vertex data defining the high-order graphics geometry in a temporary storage or queue, such as by receiving a command from the host processor that includes a pointer to a buffer in a memory system 405 and reading the vertex data from the buffer. In one embodiment, the memory system 405 may include one or more of the memory 204, the L2 cache 265, and the shared memory/L1 cache 370. The vertex data is then transmitted to the vertex shader stage 420 for processing.

The vertex shader stage 420 processes vertex data by performing a set of operations (i.e., a vertex shader or a program) once for each of the vertices. Vertices may be, e.g., specified as a 4-coordinate vector associated with one or more vertex attributes. The vertex shader stage 420 may manipulate properties such as position, color, texture coordinates, and the like. In other words, the vertex shader stage 420 performs operations on the vertex coordinates or other vertex attributes associated with a vertex. Such operations commonly including lighting operations (i.e., modifying color attributes for a vertex) and transformation operations (i.e., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shader stage 420 generates transformed vertex data that is transmitted to the hull shader stage 425.

Conventional graphics processing pipelines transmit the transformed vertex data between different stages through a set of pipeline registers or a dedicated FIFO buffer. As shown in FIG. 4, the vertex shader stage 420 may pass the vertex data directly to the hull shader stage 425, or alternately, may pass the vertex data to the hull shader stage 425 through an attribute structure 422 that is stored in the memory system 405. An attribute structure 422 that is stored to the memory system 405 by the vertex shader stage 420 may be read by one or more downstream shader units.

The storage capacity of the attribute structure 422 is less limited compared with a dedicated FIFO buffer, and the attribute structure 422 may be sized as needed to store the specific attributes generated by each vertex shader program. Therefore, when only a few attributes are generated, the amount of memory consumed is smaller than when many attributes are generated. In contrast, the size of a dedicated FIFO buffer is fixed. In one embodiment, the attribute structures 422, 432, 442, and 452 are implemented as circular buffers. Each attribute structure 422, 432, 442, and 452 may be configured to store data in a structure of arrays (SOA) or in an array of structures (AOS) format as specified by the corresponding shader program. Portions of the attribute buffers 422, 432, 442, and 452 may be cached in the L2 cache 265 and/or the shared memory/L1 cache 370 with the memory 204 serving as a spill storage when the capacity of the L2 cache 265 and/or the shared memory/L1 cache 370 is exceeded. Mechanisms using techniques known in the art may be used to ensure coherency, as needed, between the different caches and memory 204. In one embodiment, ownership of cache lines may be passed from one warp to another during execution of a shader program and the last warp to access a particular cache line may invalidate the cache line.

Separate attribute structures are stored for each of the different shader stages so that the memory allocated to store an attribute structure may be deallocated when a last consumer of the attribute structure has read the attribute structure. The memory used to store an attribute structure is allocated by the shader program that generates and stores data into the attribute structure. In contrast, the memory allocated to store texture maps and a frame buffer is allocated by a device driver and the scope of memory allocated to texture maps and the frame buffer is global, meaning that the data can be accessed by a CPU, the PPU 200, and other processing devices in a system. The scope of the memory storing the attributes structures 422, 432, 442, and 452 is limited to the shader programs executed by the PPU 200 by the processing units in the graphics processing pipeline.

The vertex attributes associated with a high-order graphics geometry that are stored in the attribute structure 422 are read by the hull shader stage 425 and processed to generate per patch attributes, where each patch may be defined by up to 32 control points. The per-patch attributes generated by the hull shader stage 425 are written to the attribute structure 432, or alternately, may also be transmitted directly to the tessellation/primitive assembly stage 430.

The tessellation/primitive assembly stage 430 receives the control points passed from the hull shader stage 425 and tessellates the patches into geometric primitives for processing by the domain shader stage 435. For example, the tessellation/primitive assembly stage 430 may be configured to group every three consecutive vertices as a geometric primitive (i.e., a triangle) for transmission to the domain shader stage 435. In some embodiments, specific vertices may be reused for consecutive geometric primitives (e.g., two consecutive triangles in a triangle strip may share two vertices). The tessellation/primitive assembly stage 430 may be configured to store intermediate data into the attribute structure 432 and read the intermediate data to generate the tessellated vertices that are passed to the domain shader 435 directly or through the attribute structure 432. After tessellation, the amount of data representing the graphics geometry that was received as input data 401 may be significantly larger because the granularity of the geometry typically becomes finer as the geometry is processed by the different stages of the graphics processing pipeline.

The domain shader stage 435 computes vertex position attributes for each tessellated vertex and stores the attributes in the attribute structure 442. The domain shader stage 435 may read attributes stored in the attribute structure 422 to compute the vertex position attributes. The attribute structure 422 provides a path for passing attributes from the vertex shader stage 420 to the domain shader stage 435 without passing the attributes through the intervening stages of the graphics processing pipeline (e.g., the hull shader stage 425 and tessellation/primitive assembly 430). In contrast, in conventional graphics processing pipelines, attributes are passed from the vertex shader stage 420 through the hull shader stage and the tessellation/primitive assembly stage to reach the domain shader stage 435.

The vertex position attributes generated by the domain shader stage 435 are passed directly to the geometry shader stage 440 or are passed to the geometry shader stage 440 through the attribute structure 442. The geometry shader stage 440 processes geometric primitives by performing a set of operations (i.e., a geometry shader program) on the geometric primitives. Geometry shading operations may generate one or more geometric primitives from each geometric primitive. In other words, the geometry shader stage 440 may subdivide each geometric primitive into a finer mesh of two or more geometric primitives for processing by the rest of the graphics processing pipeline 400. The geometry shader stage 440 transmits geometric primitives (e.g., points, lines triangles, and the like) to the viewport stage 450 either directly or through the attribute structure 452.

The viewport stage 450 may read attributes from one or more of the attribute structures 422, 432, 442, and 452. The viewport stage 450 performs a viewport transform, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (i.e., discarded) because the geometric primitive will not contribute to the final rendered scene. Any geometric primitive that is partially inside the viewing frustum and partially outside the viewing frustum may be clipped (i.e., transformed into a new geometric primitive that is enclosed within the viewing frustum. Furthermore, geometric primitives may each be scaled based on depth of the viewing frustum. All potentially visible geometric primitives are then transmitted to the rasterization stage 460.

The rasterization stage 460 converts the 3D geometric primitives into 2D fragments. The rasterization stage 460 may be configured to utilize the vertices of the geometric primitives to setup a set of plane equations from which various attributes can be interpolated. The rasterization stage 460 may also compute a coverage mask for a plurality of pixels that indicates whether one or more sample locations for a pixel intercept the geometric primitive. In one embodiment, z-testing may also be performed to determine if the geometric primitive is occluded by other geometric primitives that have already been rasterized. The rasterization stage 460 generates fragment data (i.e., coverage masks for each covered geometric primitive) that are transmitted to the pixel shader stage 470.

The pixel shader stage 470 processes fragment data by performing a set of operations (i.e., a fragment shader or a program) on each of the fragments. The pixel shader stage 470 may generate pixel data (i.e., color values) for the fragment such as by performing lighting operations or sampling texture maps using interpolated texture coordinates for the fragment. The pixel shader stage 470 generates pixel data that is transmitted to the raster operations stage 480. Rather than using only the data that is received from the rasterization stage 460, the pixel shader stage 470 may access one or more of the attribute structures 422, 432, 442, and 452 to read attributes that were generated by an upstream processing unit at a different level of the graphics geometry.

For example, the pixel shader stage 470 may read per-patch attributes that were generated and stored in the attribute structure 432 by the hull shader stage 425 and/or per-primitive attributes that were generated and stored in the attribute structure 442 by the geometry shader stage 440. The pixel shader stage 470 may read per-vertex attributes that were generated for the graphics geometry represented at the different levels from any of the attribute structures 422, 432, 442, and 452. In one embodiment, the pixel shader stage 470 may read interpolated attributes from the attribute structure 452 and the viewport stage 450 may be configured to compute additional attributes for clipped perspective corrected barycentric coordinates that are used by the pixel shader stage 470 to perform barycentric interpolation to compute per-sample or per-pixel attributes, as further described in conjunction with FIG. 6. In another embodiment, the pixel shader stage 470 may read per-patch control point attributes from the attribute structure 432 and compute the per-sample or per-pixel attributes, as further described in conjunction with FIG. 7.

The raster operations stage 480 may perform various operations on the pixel data such as performing alpha tests, stencil tests, and blending the pixel data with other pixel data corresponding to other fragments associated with the pixel. When the raster operations stage 480 has finished processing the pixel data (i.e., the output data 402), the pixel data may be written to a render target such as a frame buffer, a color buffer, or the like.

It will be appreciated that one or more additional stages may be included in the graphics processing pipeline 400 in addition to or in lieu of one or more of the stages described above. Various implementations of the abstract graphics processing pipeline may implement different stages. Furthermore, one or more of the stages described above may be excluded from the graphics processing pipeline in some embodiments. Other types of graphics processing pipelines are contemplated as being within the scope of the present disclosure. Furthermore, any of the stages of the graphics processing pipeline 400 may be implemented by one or more dedicated hardware units within a graphics processor such as PPU 200. Other stages of the graphics processing pipeline 400 may be implemented by programmable hardware units such as the SM 250 of the PPU 200.

When large numbers of different attributes are supported, bit vectors may be used between the different shader stages of the graphics processing pipeline to indicate the attributes that are used for a particular image or even for particular graphics geometry. In one embodiment, the bit vectors may be used to determine the capacity (i.e., the amount of memory allocated) for each attribute structure. In another embodiment, the capacity of each attribute structure may be configured to store the maximum number of attributes that are supported.

Figure 5:
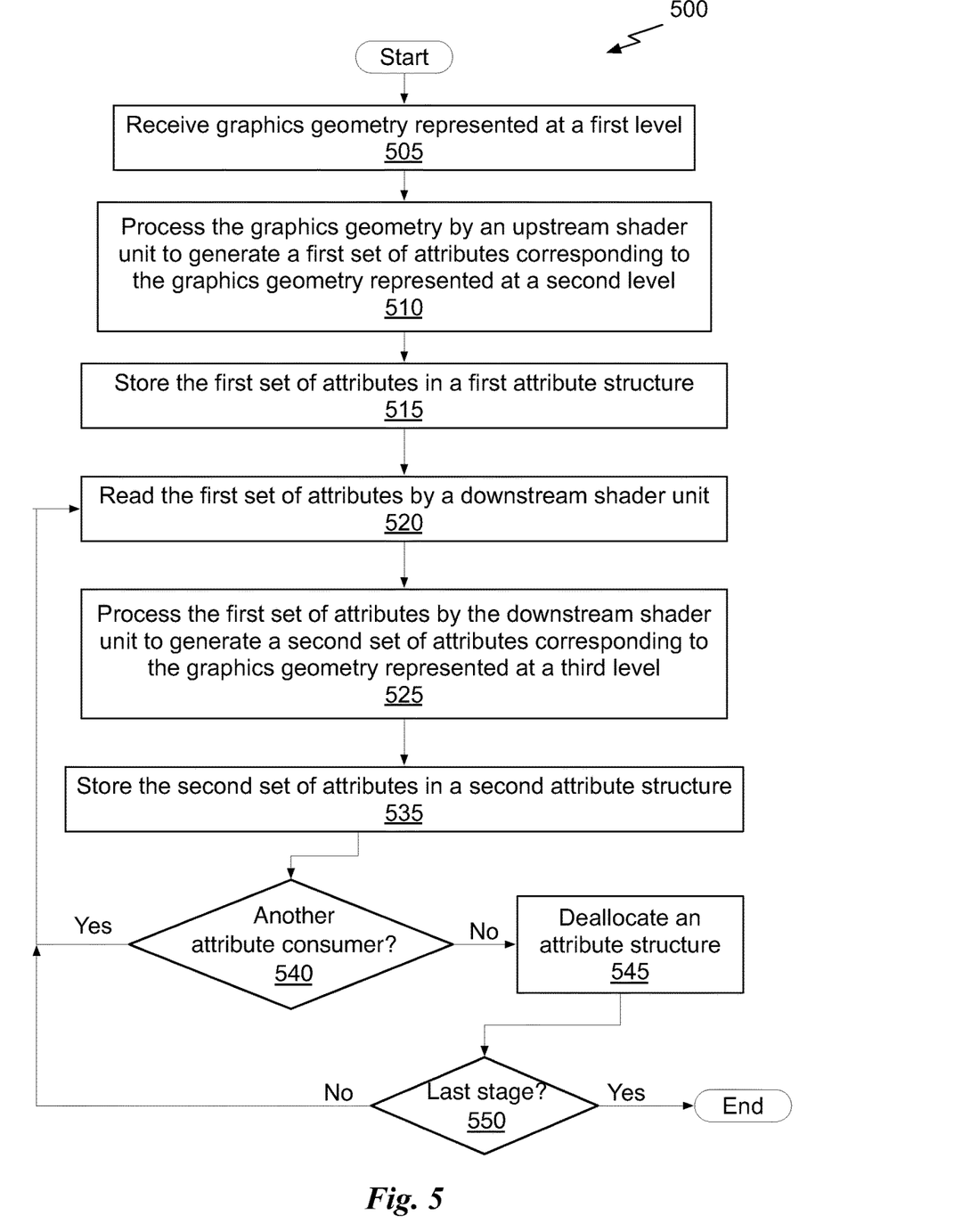
FIG. 5 illustrates another flowchart of a method for passing attribute structures between shader stages of a graphics pipeline, in accordance with another embodiment.

FIG. 5 illustrates another flowchart of a method 500 for passing attribute structures between shader stages of a graphics pipeline, in accordance with another embodiment. The lifespan (i.e. time from allocation to deallocation) of an attribute structure may be determined based on the downstream processing units that read the particular attribute structure.

At step 505, graphics geometry represented at a first level is received by a graphics processing pipeline. At step 510, the upstream shader unit processes the graphics geometry to generate a first set of attributes corresponding to the graphics geometry represented at a second level. In the context of the present description, the upstream shader unit may be one of the vertex shader stage 420, the hull shader stage 425, the tessellation/primitive assembly stage 430, the domain shader stage 435, and the geometry shader stage 440.

At step 515, the upstream shader unit also stores the first set of the attributes in an attribute structure 422, 432, 442, or 452 within the memory system 405. The attribute structures 422, 432, 442, and 452 can be read by a downstream shader unit and additional shader units that are downstream in the graphics processing pipeline relative to the upstream shader unit. In the context of the present description, the upstream shader unit and additional shader units may include the hull shader stage 425, the tessellation/primitive assembly stage 430, the domain shader stage 435, the geometry shader stage 440, the viewport stage 450, and the pixel shader stage 470.

At step 520, the first set of attributes is read by a downstream shader unit. At step 525, the downstream shader unit processes the graphics geometry to generate a second set of attributes corresponding to the graphics geometry represented at a third level. The downstream shader unit may also process the first set of attributes. At step 535, the downstream shader unit stores the second set of attributes in a second attribute structure, such as the attribute structure 432, 442, or 452 within the memory system 405. At step 540, the downstream shader unit determines if another downstream shader unit will consume the attribute structure read by the downstream shader unit at step 520, and, if not, at step 545 the attribute structure read by the downstream shader unit at step 520 is deallocated. At step 550, the downstream shader unit determines if the downstream shader unit is the last stage in the graphics processing pipeline. If the downstream shader unit is the last stage in the graphics processing pipeline, then the geometry processing terminates. Otherwise, steps 520, 525, 535, 540, 545, and 550 are repeated.

If, at step 540, the downstream shader unit determines that another downstream shader unit will consume the attribute structure read by the downstream shader unit at step 520, then steps 520, 525, 535, 540, 545, and 550 are repeated.

Figure 6:
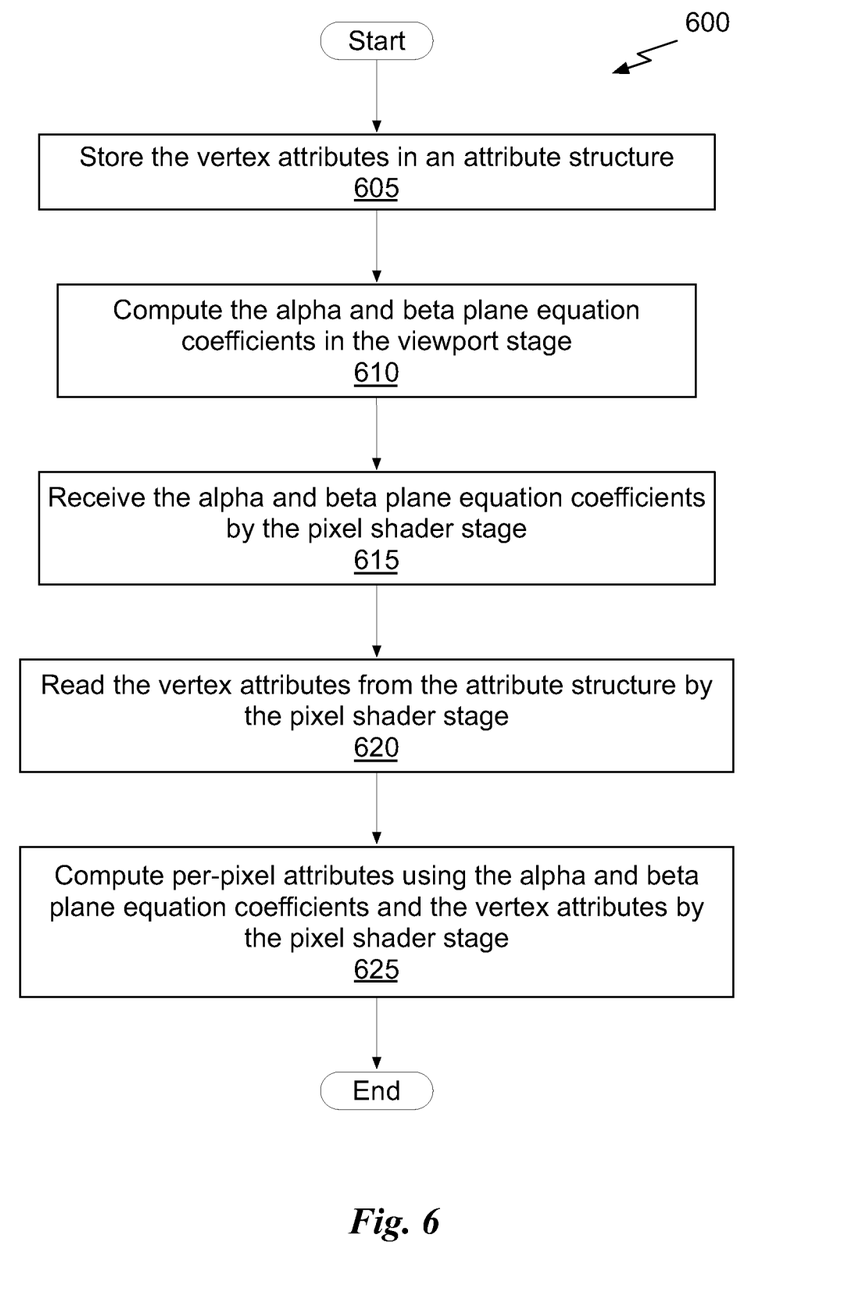
FIG. 6 illustrates a flowchart of a method for using barycentric plane equation coefficients to compute per-pixel attributes, in accordance with another embodiment.
Figure 7A:
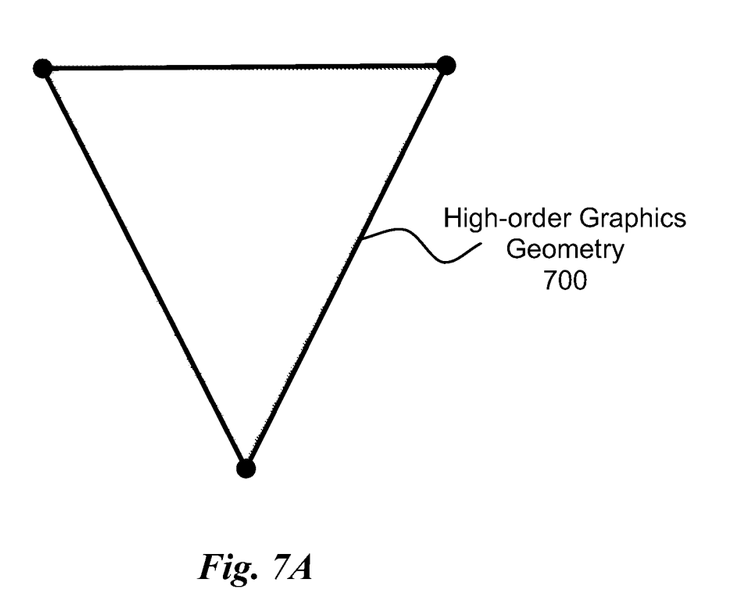
FIGS. 7A, 7B, and 7C illustrate processing of graphics geometry, in accordance with one embodiment.

FIG. 6 illustrates a flowchart of a method 600 for using barycentric plane equations to compute per-pixel attributes, in accordance with another embodiment. At step 605, vertex attributes computed by one or more of the shader stages (e.g., the vertex shader stage 420, the hull shader stage 425, the domain shader stage 435, and the geometry shader stage 440) may be stored into an attribute structure. As previously explained, each different stage of the graphics processing pipeline may generate attributes corresponding to the graphics geometry represented at a different level. For example, the vertex attributes stored by the vertex shader stage 420 may represent a high-order graphics geometry in object space, the vertex attributes stored by the hull shader stage 425 may represent control points of a surface patch, the vertex attributes stored by the domain shader stage 435 may represent tessellated vertices, and the vertex attributes stored by the geometry shader stage 440 may represent vertices of graphics primitives (e.g., lines, points, triangles, and the like).

At step 610, the viewport stage 450 computes the plane equation coefficients for the alpha and beta barycentric coordinates for a graphics geometry. The alpha and beta plane equation coefficients may be passed from the viewport stage 450 to downstream shader stages through the shader stages rather than being stored into an attribute structure. In other embodiments, a different stage of the graphics pipeline that is upstream from the pixel shader stage 470 computes the plane equation coefficients for the alpha and beta barycentric coordinates. The plane equation coefficients are used by the pixel shader stage 470 to compute per-pixel or per-sample attributes. The pseudo-code shown in TABLE 1 may be used to compute the alpha and beta values.

TABLE 1

| | |
|---|---|
| IPA 1/w | // interpolate 1/w at pixel |
| RCP w,1/w | // compute w |
| IPA.MUL alpha,w | // interpolate alpha at pixel and multiply by 1/w |
| IPA.MUL beta,w | // interpolate beta at pixel and multiply by 1/w |

In a conventional graphics processing pipeline, the viewport stage 450 computes plane equation coefficients for all of the attributes that will be interpolated by the pixel shader stage. The plane equation coefficients are computed for graphics geometry that may not reach the pixel shader stage 470 due to z-buffering or other culling operations. Therefore, computing only plane equations for alpha and beta may be a significant reduction in the amount of data that is passed from the viewport stage 450 to the pixel shader stage 470. Reducing the number of plane equation coefficients that are computed earlier in the graphics processing pipeline may also reduce the amount of power consumed.

At step 615, the alpha and beta plane equation coefficients are received by the pixel shader stage 470. In one embodiment, the alpha and beta plane equation coefficients may be received from the rasterization stage 460. At step 620, the pixel shader stage 470, reads the vertex attributes from the attributes structure. As previously explained, the pixel shader stage 470 may read vertex attributes for one or more different levels of representation of the graphics geometry. In contrast, a conventional pixel shader stage receives only per-primitive vertex attributes for points, lines, and triangles generated by the geometry shader stage 440.

At step 625, the pixel shader stage 470 computes per-pixel (or per-sample) attributes using the alpha and beta plane equation coefficients and the vertex attributes read from the attribute structure. The pseudo-code shown in TABLE 2 may be used to compute an arbitrary attribute using the alpha and beta values.

TABLE 2

```
LD v0      // read attribute for vertex 0 from an attribute structure
LD v1      // read attribute for vertex 1 from the attribute structure
LD v2      // read attribute for vertex 2 from the attribute structure
ADD v0,v0,-v1
ADD v1,v0,-v2
DP2.5 v0,a0,v1,a1,v    // compute an attribute
```

The ability of the pixel shader stage 470 to access vertices stored in an attribute structure enables the pixel shader stage 470 to compute per-pixel and/or per-sample attributes using barycentric coordinates using vertices for graphics geometry stored at different levels.

Also, only the plane equation coefficients for the barycentric coordinates need to be passed through the downstream stages to reach the pixel shader stage 470 rather than passing separate plane equation coordinates for each attribute that is interpolated by the pixel shader stage 470 to compute the per-pixel and/or per-sample attributes. Furthermore, computations are postponed (other than the computation of alpha and beta) until after z-testing and other culling operations. In conventional graphics processing pipelines the per-attribute plane equation coefficients that are computed before z-testing and other culling operations may be discarded before reaching the pixel shader stage 470. In contrast, in one embodiment, a limited number of plane equation coefficients are computed (e.g., alpha and beta), so fewer computed coefficients are discarded as the result of z-testing and other culling operations, reducing the amount of storage needed to store attributes and possibly reducing power.

FIG. 7A illustrates processing of graphics geometry by the hull shader stage 425, in accordance with one embodiment. The hull shader stage 425 receives a patch, such as the high-order graphics geometry 700 produced by the vertex shader stage 420 and computes attributes at each of three control points that define the high-order graphics geometry 700. Although, the high-order graphics geometry 700 is defined by three control points, high-order graphics geometry may include between 1 and 32 or more control points. The hull shader stage 425 may also be configured to receive a different number of control points than the number of control points that are output by the hull shader stage 425.

Figure 7B:
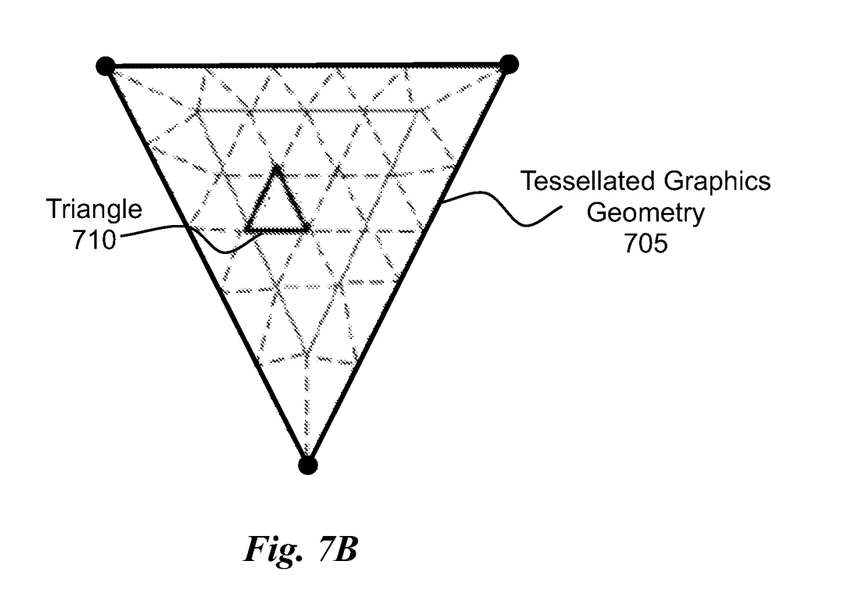

FIG. 7B illustrates processing of graphics geometry by the tessellation/primitive assembly stage 430, in accordance with one embodiment. The tessellation/primitive assembly stage 430 receives the patch, such as the high-order graphics geometry 700 produced by the vertex shader stage 415 and the attributes at the three control points and generates the topology for tessellated graphics geometry and (u,v) coordinates for each tessellated vertex of the high-order graphics geometry 700. The tessellation/primitive assembly stage 430 produces the tessellated graphics geometry 705 that includes tessellated vertices that define graphics geometry, such as the triangle 710.

The domain shader stage 435 may then compute the position at the vertices of each tessellated graphics geometric primitive. Conventionally, the domain shader stage 435 would also compute other vertex attributes, such as lighting, texture coordinates, and the like. However, when attributes structures are available, the computation of the other vertex attributes may be performed by the pixel shader stage 470 using data stored in one or more of the attribute structures 422, 432, 442, and 452.

Figure 7C:
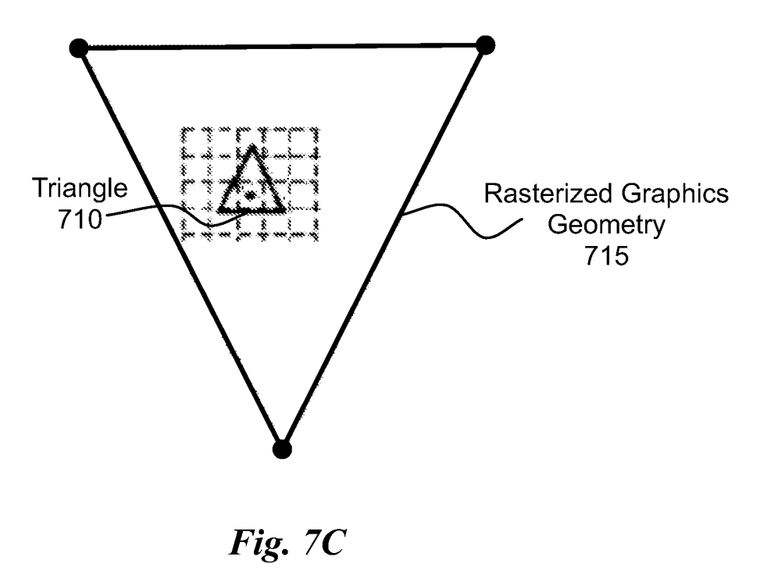

FIG. 7C illustrates processing of graphics geometry by the rasterization stage 460, in accordance with one embodiment. The rasterization stage 460 rasterizes the tessellated graphics geometry output by the viewport stage 450 to determine pixel coverage information. The pixel shader stage 470 then computes attributes at the centers of each covered pixel using the (u,v) coordinates computed by the tessellation/primitive assembly stage 430 and the attributes at the three control points computed by the hull shader stage 425. The (u,v) coordinates may be perspective corrected or linear (non-perspective corrected).

Figure 7D:
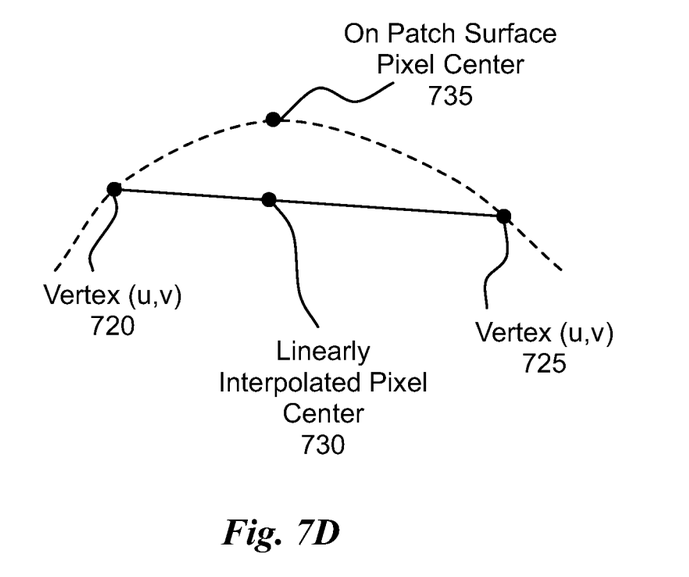
FIG. 7D illustrates the difference between attribute computation using a linear plane equation computation and a polynomial function evaluation, in accordance with one embodiment.

FIG. 7D illustrates the difference between attribute computation using a linear plane equation computation and a polynomial function evaluation, in accordance with one embodiment. The pixel shader stage 470 receives the (u,v) coordinates at vertices 720 and 725 that are typically computed by the tessellation/primitive assembly stage 430 for each of the tessellated vertices. In one embodiment, the pixel shader stage 470 linearly interpolates between the attributes defined at the vertices 720 and 725 to compute linearly or perspective interpolated per-pixel attributes at the pixel center 730 of the triangle 710. In another embodiment, the pixel shader stage 470 evaluates a polynomial function at the on patch surface pixel center 735 to compute perspective interpolated per-pixel attributes using the (u,v) coordinates at the vertices 720 and 725 of the triangle 710. Notice that the linearly interpolated attributes lie in the plane of the triangle 710. In contrast, the polynomial function evaluated attributes lie on the surface of the patch geometry and thus are a more accurate representation of the attribute.

Figure 8:
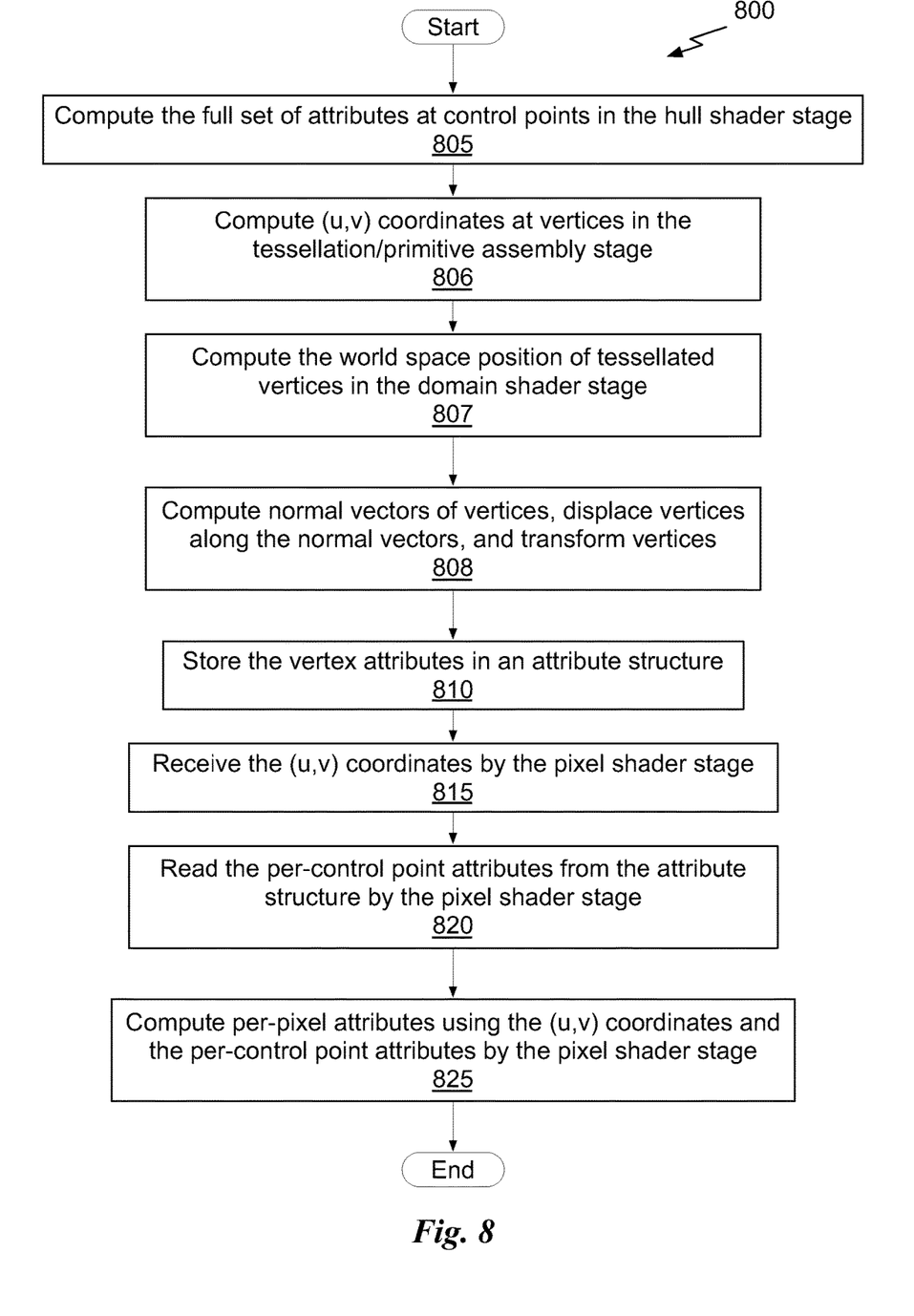
FIG. 8 illustrates a flowchart of a method for using polynomial function evaluation to compute per-pixel attributes, in accordance with another embodiment.

FIG. 8 illustrates a flowchart of a method 800 for using polynomial function (i.e., any high-order function) evaluation to compute per-pixel attributes, in accordance with another embodiment. At step 805, the hull shader stage 425 computes the full set of attributes at the control points for a graphics geometry. At step 806, tessellation/primitive assembly stage 430 computes the (u,v) coordinates at the tessellated vertices. The (u,v) coordinates may be stored as vertex attributes in an attribute structure.

At step 807, the domain shader stage 435 computes the world space position at the tessellated vertices using the (u,v) coordinates computed by the tessellation/primitive assembly stage 430. At step 808, the domain shader stage 435 computes normal vectors for each vertex, displaces the vertices along the normal vectors, and then transforms the displaced vertex positions (in world space) with the view projection matrix.

At step 810, vertex attributes computed by one or more of the shader stages (e.g., the vertex shader stage 420, the hull shader stage 425, the domain shader stage 435, and the geometry shader stage 440) or the tessellation/primitive assembly stage 430 may be stored into an attribute structure. In particular, the attributes produced at the control points by the hull shader stage 425 are stored in the attribute structure 432.

At step 815, the (u,v) coordinates (perspective corrected or non-perspective corrected) are received by the pixel shader stage 470. In one embodiment, the (u,v) coordinates may be received from the rasterization stage 460. At step 820, the pixel shader stage 470, reads the per-control point attributes from the attributes structure. As previously explained, the pixel shader stage 470 may read vertex attributes for one or more different levels of representation of the graphics geometry. At step 825, the pixel shader stage 470 computes per-pixel (or per-sample) attributes using the (u,v) coordinates and the vertex attributes read from the attribute structure, including the per-control point attributes computed at step 805.

Figure 9:
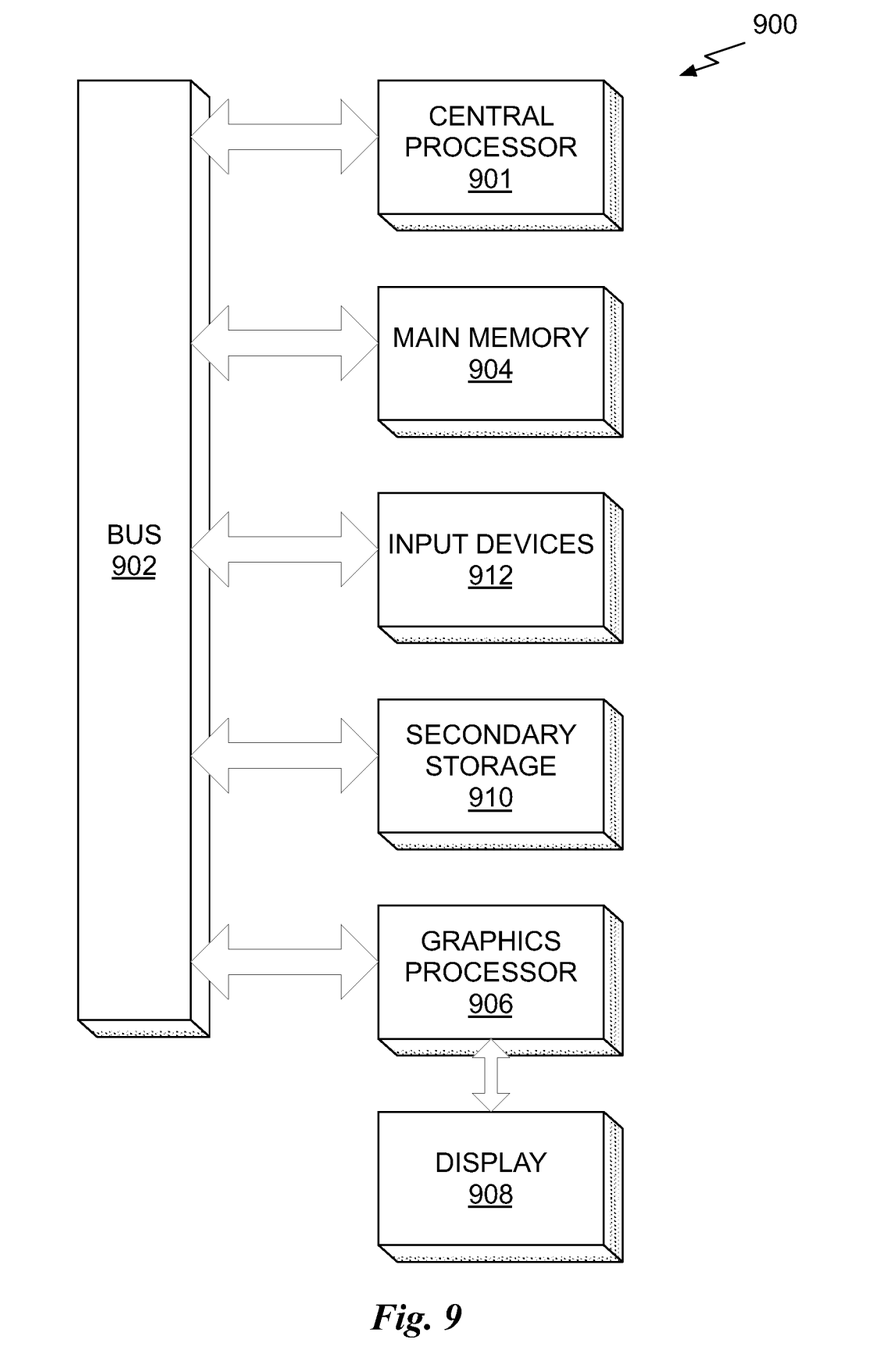
FIG. 9 illustrates an exemplary system in which the various architecture and/or functionality of the various previous embodiments may be implemented.

FIG. 9 illustrates an exemplary system 900 in which the various architecture and/or functionality of the various previous embodiments may be implemented. As shown, a system 900 is provided including at least one central processor 901 that is connected to a communication bus 902. The communication bus 902 may be implemented using any suitable protocol, such as PCI (Peripheral Component Interconnect), PCI-Express, AGP (Accelerated Graphics Port), HyperTransport, or any other bus or point-to-point communication protocol(s). The system 900 also includes a main memory 904. Control logic (software) and data are stored in the main memory 904 which may take the form of random access memory (RAM).

The system 900 also includes input devices 912, a graphics processor 906, and a display 908, i.e. a conventional CRT (cathode ray tube), LCD (liquid crystal display), LED (light emitting diode), plasma display or the like. User input may be received from the input devices 912, e.g., keyboard, mouse, touchpad, microphone, and the like. In one embodiment, the graphics processor 906 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 900 may also include a secondary storage 910. The secondary storage 910 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 904 and/or the secondary storage 910. Such computer programs, when executed, enable the system 900 to perform various functions. The memory 904, the storage 910, and/or any other storage are possible examples of computer-readable media.

In one embodiment, the architecture and/or functionality of the various previous figures may be implemented in the context of the central processor 901, the graphics processor 906, an integrated circuit (not shown) that is capable of at least a portion of the capabilities of both the central processor 901 and the graphics processor 906, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 900 may take the form of a desktop computer, laptop computer, server, workstation, game consoles, embedded system, and/or any other type of logic. Still yet, the system 900 may take the form of various other devices including, but not limited to a personal digital assistant (PDA) device, a mobile phone device, a television, etc.

Further, while not shown, the system 900 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
receiving data represented at a first level by a graphics processing pipeline including an upstream hull shader unit and a downstream pixel shader unit configured to generate per-pixel attributes;
processing the data by the upstream hull shader unit to generate a first set of attributes at control points of a surface patch;
allocating, by a first shader program executing on the upstream hull shader unit, a first attribute structure in a first portion of a memory system that can be read by the downstream pixel shader unit and any additional shader units that are downstream in the graphics processing pipeline relative to the upstream hull shader unit;
storing the first set of the attributes in the first attribute structure; and
computing, by the downstream pixel shader unit, a first per-pixel attribute for a pixel by evaluating a polynomial function defining the surface patch using the first set of attributes, wherein the first per-pixel attribute lies on the surface patch and is computed at a position corresponding to the pixel.

2. The method of claim 1, further comprising
deallocating, by a second shader program executing on the downstream pixel shader unit, the first attribute structure in the first portion of the system memory.

3. The method of claim 1, wherein the first level comprises vertices defining high-order graphics primitives in object space, the polynomial function defines the surface patch in the object space, and the pixel is in screen space.

4. The method of claim 1, further comprising:
generating a second set of attributes corresponding to the data represented at a second level by a geometry shader unit;
allocating, by a geometry shader program executing on the geometry shader unit, a second attribute structure in a second portion of the memory system that can be read by the downstream pixel shader unit; and storing the second set of the attributes in the second attribute structure.

5. The method of claim 4, wherein the processing unit is configured to perform rasterization and the second set of attributes are attributes corresponding to fragment data.

6. The method of claim 1, further comprising:
processing the first set of attributes by a processing unit to generate a second set of attributes corresponding to the data represented at a second level; and
storing the second set of the attributes in the first attribute structure.

7. The method of claim 6, further comprising:
processing the second set of attributes to generate a third set of attributes corresponding to the data represented at a third level by a domain shader unit;
allocating, by a domain shader program executing on the domain shader unit, a second attribute structure in a second portion of the memory system that can be read by the downstream pixel shader unit and an additional downstream shader unit; and
storing the third set of the attributes in the second attribute structure.

8. The method of claim 6, wherein the processing unit is configured to perform tessellation and the data at the second level represents geometric primitives.

9. The method of claim 6, wherein the second set of attributes are further comprising:
(u,v) coordinates corresponding to the data represented at the second level and, the method further comprising:
computing displaced and transformed vertices corresponding to the data represented at a third level based on the (u,v) coordinates, wherein the third level is tessellated graphics geometry.

10. The method of claim 9, further comprising:
receiving, by the downstream pixel shader unit, alpha and beta Barycentric plane equation coefficients; and
reading the second set of attributes from the second portion of the memory system; and
computing additional per-pixel attributes based on the second set of attributes and the alpha and beta Barycentric plane equation coefficients.

11. The method of claim 6, wherein the upstream hull shader unit transmits the first attributes directly to the processing unit.

12. The method of claim 1, further comprising computing (u,v) coordinates corresponding to tessellated graphics geometry.

13. The method of claim 12, further comprising:
receiving the (u,v) coordinates by the downstream pixel shader unit; and
evaluating the polynomial function defining the surface patch using the (u,v) coordinates.

14. The method of claim 1, further comprising receiving vertices of a tessellated primitive associated with the surface patch.

15. The method of claim 14, wherein the position corresponding to the pixel does not lie in the plane of the tessellated primitive defined by the vertices.

16. A non-transitory computer-readable storage medium storing instructions that, when executed by a processor, causes the processor to perform steps comprising:
receiving data represented at a first level by a graphics processing pipeline including an upstream hull shader unit and a downstream pixel shader unit configured to generate per-pixel attributes;
processing the data by the upstream hull shader unit to generate a first set of attributes at control points of a surface patch;
allocating, by a first shader program executing on the upstream hull shader unit, a first attribute structure in a first portion of a memory system that can be read by the downstream pixel shader unit and any additional shader units that are downstream in the graphics processing pipeline relative to the upstream pixel shader unit;
storing the first set of the attributes in the first attribute structure; and
computing, by the downstream pixel shader unit, a first per-pixel attribute for a pixel by evaluating a polynomial function defining the surface patch using the first set of attributes, wherein the first per-pixel attribute lies on the surface patch and is computed at a position corresponding to the pixel.

17. A system comprising:
a memory system; and
a graphics processing pipeline comprising:
a downstream pixel shader unit configured to generate per-pixel attributes;
an upstream hull shader unit that is configured to:
receive data represented at a first level;
process the data to generate a first set of attributes at control points of a surface patch;
allocate, during execution of a first shader program, a first attribute structure in a first portion of a memory system that can be read by the downstream pixel shader unit and any additional shader units that are downstream in the graphics processing pipeline relative to the upstream hull shader unit; and
store the first set of the attributes in the first attribute structure; and
the downstream shader unit that is configured to compute a first per-pixel attribute for a pixel by evaluating a polynomial function defining the surface patch using the first set of attributes, wherein the first per-pixel attribute lies on the surface patch and is computed at a position corresponding to the pixel.

18. The system of claim 17, wherein the memory system includes at least one cache that is coupled between the graphics processing pipeline and a discrete memory device.

19. The system of claim 17, wherein the system comprises a parallel processing unit (PPU) that is configured to implement the graphics processing pipeline.

* * * * *